3,743,665
STABILIZED ISOCYANATE COMPOSITION

Kenji Naito, Katsuhiko Ogino, and Hiroshi Okudo, Toyonaka, Michio Tanaka, Suita, Yoshio Kamatani, Osaka, Hiroshi Mukai, Toyonaka, and Tatsuro Takeuchi, Suita, Japan, assignors to Takeda Chemical Industries, Ltd., Osaka, Japan
No Drawing. Filed June 19, 1970, Ser. No. 47,913
Int. Cl. C07c *119/04*
U.S. Cl. 260—453 SP 17 Claims

ABSTRACT OF THE DISCLOSURE

Stabilized organic isocyanate composition containing an organic ester or esters of isocyanic acid such as xylene, ω,ω'-diisocyanate in combination with a stabilizer which is one or more of the acyl isocyanates encompassed by the formula $$R^1\text{—CX—NCY}$$
$$R^2(\text{CX—NCY})_2$$
$$R^1\text{—SO}_2\text{—NCO}$$

wherein each of X and Y is O or S, $R^1$ is an alkyl, aralkyl, aryl, all of which may be substituted by one or more halogens, —$NO_2$, —CN, alkyl or alkoxy, and $R^2$ is a bivalent hydrocarbon residue, the amount of the acyl isocyanate or acyl isocyanates being about 0.001 to 1.0 percent by weight relative to the organic isocyanate ester. The present invention also involves a method of stabilizing an organic isocyanate ester by incorporating the aforementioned stabilizer or stabilizers therein.

---

The present invention relates to a stabilized isocyanate composition. More concretely, the present invention relates to an organic isocyanate composition stabilized against undesirable polymerization and coloration.

In the present specification as well as in claims, the term "organic isocyanate" it to be construed as meaning "organic ester or esters of isocyanic acid," the ester having the structure of an ester between HNCO and an alcoholic or phenolic hydroxyl compound, and the ester may have one or more —NCO groups in its molecule. Organic isocyanates are unstable because of the high reactivity of their isocyanato groups, and have the consequent disadvantage that they are liable to be deteriorated during storage, becoming colored and giving rise to cyclic isocyanurates, dimers, oligomers and higher polymers.

Various stabilizers for incorporation in organic isocyanates to improve stability on storage have previously been proposed, such as phenols, phosphites, acyl halides, carbon dioxide, sulfur dioxide, N,N'-disubstituted thioureas and phosphorus chlorides, but none of them has provided a satisfactory stabilization effect.

It has been found unexpectedly by the present inventors that the organic isocyanates can be stabilized against said unfavorable coloration and polymerization by the incorporation of a small amount of an acyl isocyanate as a stabilizer.

Therefore, it is the main object of the present invention to provide an organic isocyanate composition which is stabilized against polymerization and coloration.

Another object of the present invention is to provide a method for stabilizing an organic isocyanate against unfavorable polymerization and coloration.

Said objects are realized by incorporating into the organic isocyanate an effective amount of one or more of acyl isocyanates which are represented by the formulae:

$$R^1\text{—CX—NCY}$$
$$R^2(\text{CX—NCY})_2$$

or $$R^1\text{—SO}_2\text{—NCO}$$

wherein each of X and Y is O or S, $R^1$ is an alkyl, aralkyl or aryl, all of which may be substituted by one or more halogens, —$NO_2$, —CN, alkyl or alkoxy, and $R^2$ is a bivalent hydrocarbon residue.

Referring to the general formulae the alkyl group for $R^1$ and the substituent thereof is exemplified by methyl, ethyl, propyl, i-propyl, butyl, s-butyl, i-butyl, t-butyl, pentyl, hexyl, dodecyl, decyl, or the like. It is preferable that the alkyl group has carbon atoms not more than 12.

The aralkyl group represented by $R^1$ is exemplified by benzyl, phenethyl or the like, and preferably those having carbon atoms at most 12.

The aryl group represented by $R^1$ is exemplified by phenyl, tolyl, naphthyl or the like, and, preferably those having carbon atoms not more than 10.

The alkoxy group is exemplified by methoxy, ethoxy, propoxy, i-propoxy, butoxy, s-butoxy, i-butoxy, t-butoxy, pentyloxy, hexyloxy, decyloxy, dodecyloxy, or the like. Among them, it is recommended that the alkoxy group is that of at most 12 carbon atoms.

The halogen atoms include bromine, chlorine, fluorine or the like.

The bivalent hydrocarbon residue represented by $R^2$ is exemplified by methylene, ethylene, propylene, phenylene, biphenylene or the like, however, preferably those having carbon atoms not more than 12.

Among the acyl isocyanates shown by the general formulae, the commercially available or the easily preparable are, for example, acetyl isocyanate, dichloroacetyl isocyanate, trichloroacetyl isocyanate, trifluoroacetyl isocyanate, nitroacetyl isocyanate, phenylacetyl isocyanate, benzoyl isocyanate, o-chlorobenzoyl isocyanate, p-nitrobenzoyl isocyanate, thioacetyl isocyanate, thiobenzoyl isocyanate, p-chlorothiobenzoyl isocyanate, acetyl isothiocyanate, benzoyl isothiocyanate, p-cyano benzoylisocyanate, terephthaloyl diisocyanate, isophthaloyl diisocyanate, methanesulfonyl isocyanate, benzenesulfonyl isocyanate, o- or p-toluenesulfonyl isocyanate, o- or p-chlorobenzenesulfonyl isocyanate, p-methoxybenzoyl isocyanate or the like.

These acyl isocyanates are employed in this invention singly, in combination with one another or in combination with one or more stabilizers.

The organic isocyanates, i.e. alcoholic or phenolic ester of isocyanic acid, are usually those simple organic isocyanates in which the —NCO group is attached to a hydrocarbon residue. The hydrocarbon residue may be straight, or cyclic, aliphatic or aromatic, mono- or polyvalent and may also contain inert substituent such as halogen or alkoxy. Among the organic isocyanates, the commercially available or the easily preparable ones include, for example, such monoisocyanates as methyl isocyanate, ethyl isocyanate, phenyl isocyanate, benzyl isocyanate, xylyl isocyanate, etc., such diisocyanates as 2,4- and 2,6-tolylene diisocyanates, o-, m- and p-phenylene diisocyanates, 4,4'-diphenylmethane diisocyanate, m- and p-xylene ω,ω'-diisocyanate and a mixture of m-isomer and p-isomer, 1,10-decamethylene diisocyanate, 1,6-hexamethylene diisocyanate, 1,4-cyclohexylene diisocyanate, 4,4'-dicyclohexylmethane diisocyanate, 1,3- and 1,4-bis-isocyanatomethylcyclohexane, 4,4'-biphenylene diisocyanate, 4,4'-methylene-bis(2-methylphenyl)diisocyanate, 4,4'-methylene-bis(2-methoxyphenyl)diisocyanate, 1,5-naphthalene diisocyanate, 4,4'-diisocyanatodiphenylether, 2,2'-bis(4-isocyanatophenyl)-propane, etc., and such polyisocyanates as 4,4',4"-triphenlymethane triisocyanate, toluene-2,4,6-triisocyanate, etc.

The organic isocyanates may be employed singly, in combination, or in a mixture of its isomers, for example, xylene ω,ω'-diisocyanate may be any of o-, m- and p-isomers or a mixture of more than one of them.

The effective amount of the acyl isocyanate or acyl isocyanates for stabilizing the organic isocyanates is usually about 0.001% to 1% by weight, more preferably about 0.03% to 0.2% by weight, relative to the organic isocyanates to be stabilized, and said ingredients in the particular ratio are brought into an intimate contact with each other.

The organic isocyanates are usually prepared by allowing the corresponding amines to react with phosgene and are recovered from the reaction mixture by means of distillation. The incorporation of the stabilizer may be made to a recovered isocyanate or alternatively to said reaction mixture containing thus produced organic isocyanates. In the latter case, the reaction mixture in admixture with the stabilizer is preferably followed by the distillation so as to obtain the stabilized isocyanate composition containing the organic isocyanate and the stabilizer.

Many organic isocyanates are unstable, but xylene $\omega,\omega'$-diisocyanate (hereinafter referred to as XDI) is particularly unstable. For example, when the hydrolyzable chlorine content of XDI is less than 0.01 percent on weight basis, XDI sometimes is converted into a solid polymer or forms a turbid liquid containing a polymer on storage for a few weeks. Even when no change in the appearance of XDI is recognized, the formation of an insoluble material is observed upon adding the stored XDI into toluene. In this connection, polymerization of XDI can be intentionally accelerated by the addition of a small amount of sodium cyanide.

According to the present invention, even such an XDI containing a basic material, for example, sodium cyanide or the hydrolyzable chlorine in said range can be stabilized remarkably.

The following experiments will serve to illustrate the present invention, showing a part of usefulness and unobviousness of the present invention without limiting the scope of this invention thereto.

EXPERIMENT 1

XDI (m-isomer 70%, p-isomer 30%) prepared by first, phosgenating dimethylbenzene-$\omega,\omega'$-diamine and then subjecting the product to repeated fractional distillation until its hydrolyzable chlorine content reaches 0.01%, is redistilled. On the other hand, test samples of stabilizers are weighed into as many 50 cc. clear colorless bottles, respectively. The distilled XDI is poured in each of the bottles and air within each bottle is replaced with nitrogen gas. The bottles are sealed and stored. Every week 1 gram each of the samples is taken out, and is dissolved in 20 milliliters of toluene to examine the solubility of each sample.

The results are as follows.

| Stabilizer | Amount of the stabilizer (percent) | Solubility in toluene after— | | | |
|---|---|---|---|---|---|
| | | 1 week | 2 weeks | 3 weeks | 4 weeks |
| Stabilizer of this invention: | | | | | |
| Trichloroacetyl isocyanate | 0.05 | Clear | Clear | Clear | Clear. |
| Trifluoroacetyl isocyanate | 0.05 | do | do | do | Do. |
| Dichloroacetyl isocyanate | 0.05 | do | do | do | Do. |
| Benzoyl isocyanate | 0.05 | do | do | do | Do. |
| Benzenesulfonyl isocyanate | 0.05 | do | do | do | Do |
| p-Toluenesulfonyl isocyanate | 0.05 | do | do | do | Do. |
| Thioacetyl isocyanate | 0.05 | do | do | do | Do. |
| Benzoyl isothiocyanate | 0.05 | do | do | do | Do. |
| Terephthaloyl diisocyanate | 0.05 | do | do | do | Do. |
| p-Cyanobenzoyl isocyanate | 0.05 | do | do | do | Do. |
| Control: | | | | | |
| No stabilizer | | After 3 days, the composition itself is turbid and gives a number of precipitates in toluene. | | | |
| Pyrogallol | 0.05 | Turbidity after 4 days. | | | |
| Pyrocatechol | 0.05 | Gelation after 1 day. | | | |
| Guaiacol | 0.05 | Turbidity after 2 days. | | | |
| Triphenyl phosphite | 0.05 | Gelation after 2 days. | | | |
| Phosphorous pentachloride | 0.05 | Gelation | Turbidity | | |
| Benzoyl chloride | 0.05 | Clear | do | | |
| Acetyl chloride | 0.05 | do | Clear | Turbidity | |
| Carbon dioxide | [1] 0.1 | Gelation after 2 days | | | |
| Sulfur dioxide | [1] 0.1 | Clear | Clear | Turbidity | |
| Phosgene | 0.05 | do | do | Clear | Turbidity. |

[1] Approximately.

It is also to be noted that the XDI compositions containing any of the present stabilizers can be safely stored for a long period of time (e.g. longer than one year) without causing any polymerization or coloring.

EXPERIMENT 2

XDI (m-isomer 70%, p-isomer 30%) containing 0.01 percent by weight of hydrolyzable chlorine shows turbidity in relatively a short period of storage. Various stabilizers are added to this turbid XDI. The resulting mixtures are distilled again to give stable XDI compositions. To each of these XDI compositions, 0.1% of sodium cyanide is added and the mixture is allowed to stand at 15° C. so as to see if turbidity occurs. Portions of the XDI compositions are stored in nitrogen-filled bottles to examine the solubility of 1 gram of each sample in 20 milliliters of toluene. The results are as follows.

| Stabilizer | Amount of the stabilizer (percent) | Gelation by sodium cyanide | Solubility in toluene after 4 weeks |
|---|---|---|---|
| Stabilizer of this invention: | | | |
| Trichloroacetyl isocyanate | 0.1 | Unchanged for 4 days | Clear. |
| Trifluoroacetyl isocyanate | 0.1 | do | Do. |
| Benzenesulfonyl isocyanate | 0.1 | do | Slightly turbid. |
| Thioacetyl isocyanate | 0.1 | do | Do. |
| p-Nitrobenzoyl isocyanate | 0.1 | Turbidity after 3 days | Clear. |
| Control: | | | |
| No stabilizer | | Immediate gelation | Composition itself shows turbidity in 4 days. |
| Pyrogallol | 0.2 | do | Turbid. |
| Guaiacol | 0.2 | do | Do. |
| Triphenyl phosphite | 0.2 | do | Do. |
| Benzoyl chloride | 0.2 | Gelation after 1 day | Do. |
| Carbon dioxide | 1.0 | Immediate gelation | Do. |
| N,N'-dibutylthiourea | 0.2 | do | Do. |

EXPERIMENT 3

4,4'-diphenylmethane diisocyanate, prepared by phosgenating p,p'-methylene-dianiline and by purifying the product, is distilled. At 45° C., the distillate is fractionally poured in 50 cc. clear colorless bottles each bottles previously containing weighed portion of the following stabilizers.

After the air in each bottle is replaced with nitrogen gas, the bottles are sealed and stored at 60° C. After 15 days, 1 gram of each sample is added into 20 milliliters of toluene, and the amount of insolubles formed is measured.

The results are as follows.

| Stabilizer | Amount of the stabilizer (percent) | Precipitation | Insolubles in toluene (percent) |
|---|---|---|---|
| Stabilizer of this invention; | | | |
| Trichloroacetyl isocyanate | 0.02 | None | <0.01 |
| Trifluoroacetyl isocyanate | 0.02 | do | <0.01 |
| Benzenesulfonyl isocyanate | 0.02 | do | <0.01 |
| p-Cyanobenzoyl isocyanate | 0.02 | do | <0.01 |
| Thioacetyl isocyanate | 0.02 | do | <0.01 |
| Terephthaloyl diisocyanate | 0.05 | do | <0.01 |
| Control; | | | |
| No stabilizer | | Precipitates | 0.3 |
| Pyrogallol | 0.05 | do | 0.03 |
| Guaicol | 0.05 | do | 0.05 |
| Triphenyl phosphite | 0.05 | do | 1.0 |
| Phosphorus pentachloride | 0.05 | Slight amount | 0.05 |
| Benzoyl chloride | 0.05 | do | 0.05 |
| Acetyl chloride | 0.05 | do | 0.05 |
| Phosgene | 0.05 | do | 0.07 |
| Carbon dioxide | 0.1 | Precipitates | 0.8 |
| Sulfur dioxide | 0.1 | do | 0.2 |
| N,N'-dibutylthiourea | 0.05 | do | 0.75 |

What is claimed is:

1. A stabilized organic isocyanate composition comprising, as the main component, an organic isocyanate, in an intimate admixture with one or more of acyl isocyanates which are represented by the formulae:

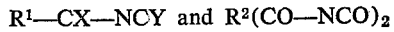

wherein each of X and Y is O or S, $R^1$ is an alkyl having not more than 12 carbon atoms, aralkyl having at most 12 carbon atoms, aryl having not more than 10 carbon atoms, all of which may be substituted by one or more halogens, —$NO_2$, —CN, or alkoxy having at most 12 carbon atoms, and $R^2$ is phenylene, and the amount of the acyl isocyanate or acyl isocyanates being about 0.001 to 1.0 percent by weight relative to the organic isocyanate contained.

2. A composition as claimed in claim 1, wherein the acyl isocyanate is trichloroacetyl isocyanate.
3. A composition as claimed in claim 1, wherein the acyl isocyanate is trifluoroacetyl isocyanate.
4. A composition as claimed in claim 1, wherein the acyl isocyanate is benzoyl isocyanate.
5. A composition as claimed in claim 1, wherein the acyl isocyanate is benzoyl isothiocyanate.
6. A composition as claimed in claim 1, wherein the acyl isocyanate is p-nitrobenzoyl isocyanate.
7. A composition as claimed in claim 1, wherein the acyl isocyanate is p-cyanobenzoyl isocyanate.
8. A composition as claimed in claim 1, wherein the acyl isocyanate is terephthaloyl diisocyanate.
9. A method for stabilizing an organic isocyanate, which comprises incorporating into the organic isocyanate an effective amount of one or more of acyl isocyanates represented by the formulae:

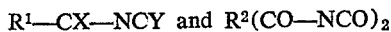

wherein each of X and Y is O or S, $R^1$ is an alkyl having not more than 12 carbon atoms, aralkyl having at most 12 carbon atoms, or aryl having not more than 10 carbon atoms, all of which may be substituted by one or more halogens, —$NO_2$, —CN, or alkoxy having at most 12 carbon atoms, and $R^2$ is phenylene.

10. A method as claimed in claim 9, wherein the amount of the acyl isocyanate or acyl isocyanates is about 0.001% to 1% by weight relative to the organic isocyanate.
11. A method as claimed in claim 9, wherein the acyl isocyanate is trichloroacetyl isocyanate.
12. A method as claimed in claim 9, wherein the acyl isocyanate is trifluoroacetyl isocyanate.
13. A method as claimed in claim 9, wherein the acyl isocyanate is benzoyl isocyanate.
14. A method as claimed in claim 9, wherein the acyl isocyanate is benzoyl isothiocyanate.
15. A method as claimed in claim 9, wherein the acyl isocyanate is p-nitrobenzoyl isocyanate.
16. A method as claimed in claim 9, wherein the acyl isocyanate is p-cyanobenzoyl isocyanate.
17. A method as claimed in claim 9, wherein the acyl isocyanate is terephthaloyl diisocyanate.

References Cited
UNITED STATES PATENTS 3,330,849   7/1967   Ulrich _____ 260—453

LEWIS GOTTS, Primary Examiner

D. H. TORRENCE, Assistant Examiner

UNITED STATES PATENT OFFICE
CERTIFICATE OF CORRECTION

Patent No. 3,743,665　　　　　　　　　Dated July 3, 1973

Inventor(s) Kenji Naito, Katsuhiko Ogino, Hiroshi Okudo, Michio Tanaka, Yoshio Kamatani, Hiroshi Mukai Tatsuro Takeuchi It is certified that error appears in the above-identified patent and that said Letters Patent are hereby corrected as shown below:

Column 1, between lines 6 and 7, under the title, please insert the following:

-- Claims priority, application Japan, June 20, 1969,

Serial No. 48748/1969 --.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents